Patented Oct. 12, 1954

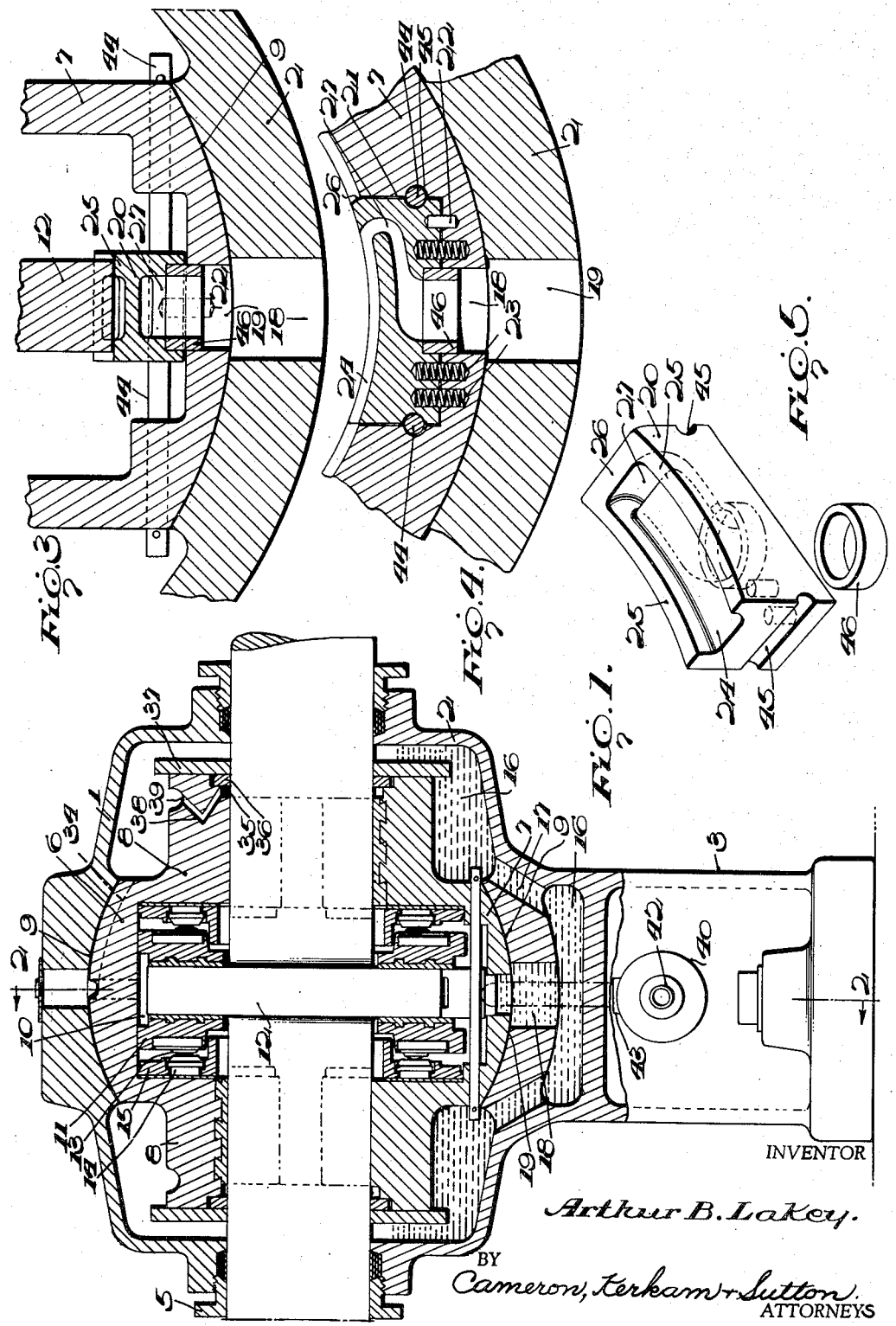

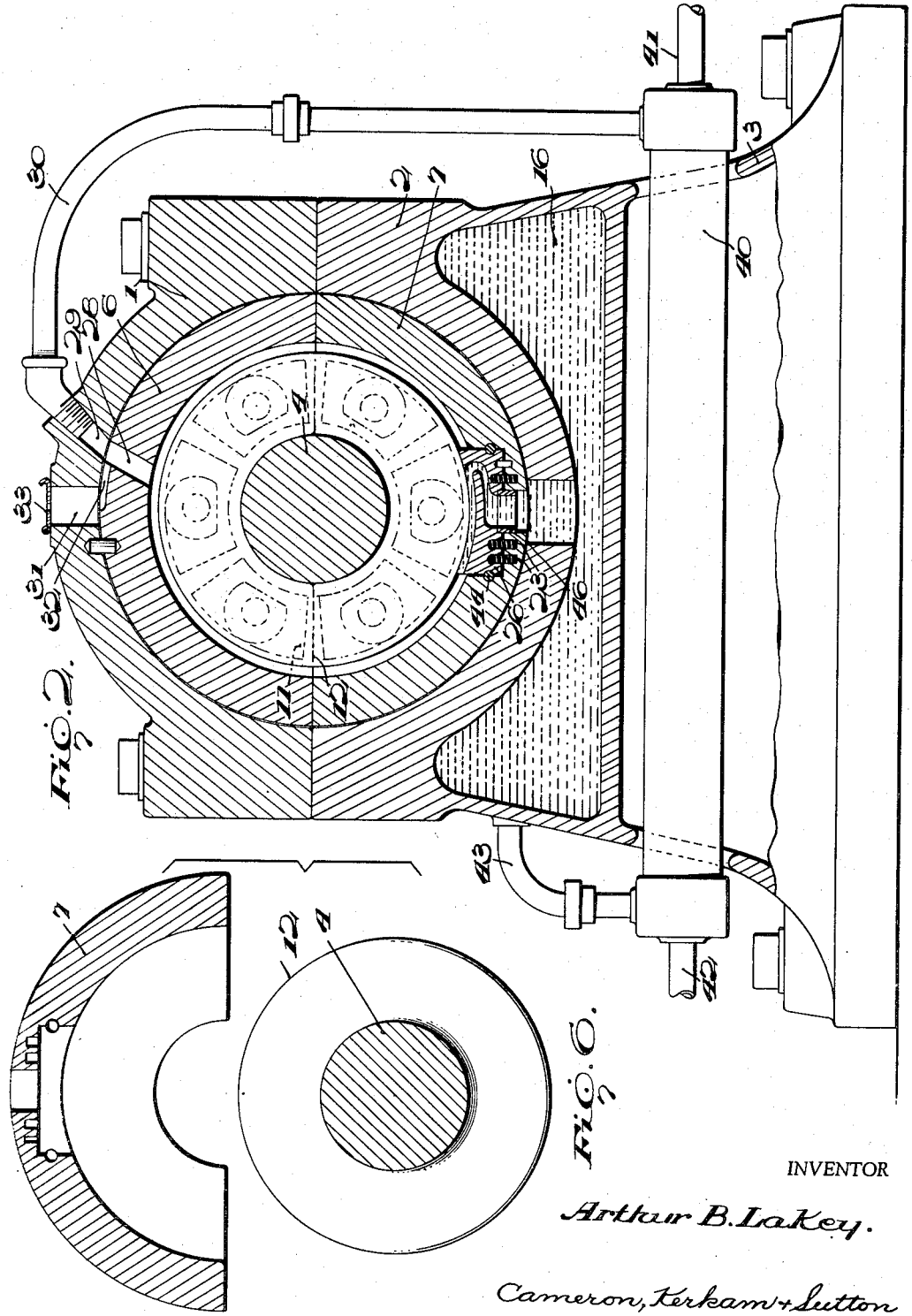

2,691,556

UNITED STATES PATENT OFFICE 2,691,556

COMBINED THRUST AND RADIAL BEARING

Arthur B. Lakey, Philadelphia, Pa., assignor to Kingsbury Machine Works, Inc., Philadelphia, Pa., a corporation of Delaware Application March 26, 1951, Serial No. 217,450

7 Claims. (Cl. 308—168)

This invention relates to combined thrust and radial bearings, and more particularly to such bearings in which a radial guide or journal bearing is combined with a thrust bearing of the Kingsbury type. The invention is especially adapted for use in bearings operating at relatively high speeds, but it will be understood that it can be applied also to any other desired type of bearing.

It is an object of the invention to provide an improved bearing of the above type having radial or journal bearings that are integrally combined with the housing or shell in which the thrust bearing elements are mounted.

Another object is to provide a bearing of the above type having improved means for lubricating both the thrust bearing and the radial bearings.

Another object is to provide an improved bearing of the combined thrust and radial type in which the radial bearings act as oil seals for a thrust cavity in which the thrust bearing elements are housed and at the same time are lubricated by oil from said cavity.

A further object is to provide improved oil pumping means housed within the thrust cavity and maintaining the same filled with circulating oil.

A still further object is to provide a bearing of the type characterized above having improved means for circulating and cooling the lubricating oil.

One embodiment of the invention has been illustrated in the accompanying drawings, but it is to be expressly understood that said drawings are for purposes of illustration only and are not to be taken as a definition of the limits of the invention, reference being had to the appended claims for this purpose.

In the drawings,

Fig. 1 is a longitudinal vertical section through a bearing embodying the invention;

Fig. 2 is a transverse section through the bearing shown in Fig. 1;

Fig. 3 is an enlarged sectional view taken on the line 3—3 of Fig. 2;

Fig. 4 is an enlarged sectional view taken on the line 4—4 of Fig. 1;

Fig. 5 is a perspective view of an oil pumping device; and

Fig. 6 is a diagrammatic view illustrating the method of assembling certain of the bearing parts.

The bearing may be mounted in any suitable type of housing, here shown as comprising an upper housing part 1 and a lower housing part 2 including a supporting pedestal 3, the bearing parts 1 and 2 being secured together in any suitable manner and cooperating to mount and enclose the bearing. As shown in Fig. 1, the housing is traversed by shaft 4, and the housing may be sealed around the shaft by any suitable means such as the gland nuts 5.

Inside the housing described above is a bearing shell adapted to enclose a portion of the shaft 4 and formed in sections for assembly as hereinafter described, the shell being shown as comprising an upper shell member 6 and a lower shell member 7 each of which extends around approximately 180° of the shaft, the two members engaging one another in a horizontal plane close to and approximately parallel with the axis of the shaft. The ends of the shell members 6 and 7 are reduced in diameter as indicated at 8, the cooperating ends 8 of the two shell members surrounding and forming radial or journal bearings for the shaft 4. The intermediate portions of the shell members are enlarged in diameter and preferably provided with substantially spherical surfaces 9 which engage correspondingly shaped spherical surfaces formed in the upper and lower housing parts 1 and 2 so that the bearing is capable of self-alignment. These enlarged intermediate portions of the shell members are also hollow and cooperate to form a thrust cavity 10 surrounding the shaft and closed in the axial direction, or in other words at both ends, by the engagement of the radial bearings 8 with the shaft.

The thrust cavity 10 houses a thrust bearing preferably of the Kingsbury type and comprising a suitable number of bearing shoes 11 which engage and take the thrust of a thrust collar 12 formed on the shaft 4 and rotating in the thrust cavity 10. The shoes 11 may be of any suitable type and as shown they are supported in bearing engagement with the collar 12 by hardened inserts 13 which engage hardened plugs 14 mounted in a cage 15 which is seated against the side walls of the thrust cavity 10. Accordingly the thrust bearing is non-equalizing in the form shown, but an equalizing thrust bearing can be employed if desired. When the thrust bearing is designed to take thrust in either direction, two sets of shoes are employed, one on each side of the thrust collar 12, but it will be understood that in case thrust is exerted in only one direction, one of the sets of shoes can be omitted.

In operation, the thrust cavity 10 is maintained filled with circulating oil at all times in order to assure the effective lubrication of the thrust and radial bearings, a supply of lubricating oil being provided in any desired manner as by means of an oil reservoir 16 shown as formed by the lower part of the housing part 2. The oil level in the end sections of the reservoir below the radial bearings 8 preferably is maintained close to the shaft 4 as shown in Fig. 1, these sections communicating through passages 17 with the main reservoir space below the spherical seat in the lower housing part 2. An opening or passage 18 in this lower spherical seat permits oil from the reservoir to pass therethrough into an aligned passage 19 extending through the lower bearing shell 7 into the thrust cavity.

An oil pumping device 20, preferably of the viscosity type, is disposed inside the thrust cavity in communication with the passage 19 for drawing oil from the reservoir and pumping it into the cavity to fill the same. As shown, this pumping device is seated in an internal recess 21 formed at the bottom of the thrust cavity in the lower shell member 7, the pumping device being located in the recess by means of a dowel 22 and being resiliently supported therein by springs 23 whereby it is urged upwardly into engagement with the rotating thrust collar 12. The pumping device itself may be of any suitable type, and as shown comprises a block having a recess or groove 24 in its upper surface which is defined by curved ribs 25 extending along both edges of the block and joined at one end by a transverse rib 26. An oil passage 27 extends from the bottom of the recess 24 at one end through the block to its lower surface where it is in communication with the passage 19 in the lower bearing shell member. The ribs 25 and 26 are maintained in engagement with the collar 12 by the springs 23, and the viscosity pumping effect of the rotating thrust collar 12 draws oil from the reservoir 16 through the passages 18, 19 and 27 into the recess or groove 24 and delivers it into the thrust cavity 10 which is thus kept filled with oil. It will be understood that in case the shaft 4 rotates in both directions, a double-acting pump may be employed.

The oil circulating through the thrust cavity lubricates the thrust bearing elements and the desired portion of it escapes through a suitable outlet passage formed in the upper bearing shell member from which it is returned to the reservoir 16. As shown in Fig. 2, this outlet passage takes the form of a duct 28 extending through the upper part of the upper bearing shell member 6 and communicating with a duct 29 extending through the upper housing part 1 from which it is returned to the reservoir by suitable means including a return pipe 30 external to the bearing housing. It will be understood, however, that any other desired means for returning the oil to the reservoir can be employed.

Preferably a sight well 31 is provided at the top of the bearing housing and is connected with the outlet passage 28 by means of a restricted circumferential groove 32 in the outer surface of the upper bearing shell member 6. The groove 32 thus delivers a small amount of oil to the sight well 31 at all times when the circulation of oil through the bearing is properly maintained, and hence the presence of oil in the sight well gives an indication of proper lubrication of the bearing. Preferably the well is covered by a pivoted door 33. Accumulation of oil in the well is prevented by a drain groove 34 of greater circulating capacity than the groove 32 whereby the oil delivered to the well is returned to the reservoir. As indicated by dotted lines in Fig. 1, this drain groove extends axially from the sight well to one side of the enlarged central part of the upper bearing shell member so that the oil drained from the sight well falls onto the reduced end 8 of the shell member which forms the radial bearing for the shaft.

Lubrication of both radial bearings 8 is also provided by the circulation of oil through the thrust cavity by the pumping device 20, some of the oil in the cavity escaping by moving axially along the shaft between it and radial bearings. It will be understood that these radial bearings can be provided with any desired oil circulating grooves to facilitate their lubrication. In order to assure the presence of oil in the radial bearing at all times during operation, an oil collecting groove 35 surrounding the shaft at the end of each radial bearing is closed by suitable means such as a sealing ring 36 and a retaining ring 37. The groove 35 collects the oil which passes through and lubricates the radial bearing and this oil passes upwardly from the groove through a passage 38 which extends through the upper bearing shell member and terminates in an external collecting groove 39. The oil draining from the sight well as described above also tends to be collected in the groove 39, and dropping of oil from the end of the shell member onto the exposed shaft can be suitably prevented by enlarging the diameter of the retaining ring 37. Thus oil collected in the groove 39 drains down the sides of the upper bearing shell member and falls into the reservoir 16.

The main body of oil circulating through the thrust cavity is preferably cooled before it is returned to the reservoir. Any suitable type of cooling means can be employed for this purpose, and the cooling device can be located either externally to the bearing housing or within the lower part of the bearing housing. In the form shown, the pipe 30 through which oil escapes from the thrust cavity 10 leads to a suitable oil cooler 40 located in the pedestal 3 and in which the oil is cooled by means of a circulating cooling liquid such as water that enters the cooler through a pipe 41 and leaves the cooler through a pipe 42. The cooled oil leaves the cooler through pipe 43 and is returned to the reservoir 16.

In assembling the bearing, the shaft is jacked up and the viscosity pumping unit 20 is placed in the recess 21 of the lower bearing shell member in which it is suitably retained as by means of cotter pins or rods 44 passing through the sides of the bearing shell member and between the end walls of the block 20 and the end walls of the recess 21, these end walls having suitable grooves 45 to receive the pins. Preferably a sealing ring 46 is secured in the mouth of the passage 27 of the pumping device and extends into the passage 19 of the shell member to close the gap between these parts. The shell member and pump are inverted over the shaft 4 as shown in Fig. 6 and then lowered onto the shaft and rolled around the shaft into proper position beneath the shaft. The split cages 14 for the thrust bearing are then assembled and the individual shoes 11 are inserted into their respective niches, the cages being rolled around the shaft if necessary to facilitate the assembly. Shims 47 between the cages 15 and the sides of the thrust cavity permit control of the axial position of the thrust collar and assure proper end play. The upper bearing shell 6 with its thrust bearing parts is then lowered into place, and the upper housing part 1 is then secured in position.

Thus the two bearing shell members, when assembled, provide radial or journal bearings on both sides of the thrust cavity and seal the cavity against escape of oil along the shaft except for that which is utilized to lubricate the radial bearings. The pumping unit is also enclosed within the thrust cavity and assembled as a unit with one of the bearing shell members, and serves to maintain the thrust cavity filled with oil. Hence the thrust bearing elements are immersed in oil at all times during operation of the bearing, and at the same time the oil circulated by the pump is supplied to the radial bearings so that all bearing parts are effectively lubricated.

While only one embodiment of the invention has been described and illustrated in the drawings, it will be understood that the invention is not restricted to this embodiment and can be embodied in other mechanical forms, and also that various changes can be made in the form, details of construction and arrangement of the parts without departing from the spirit of the invention. Reference therefore should be had to the appended claims for a definition of the limits of the invention.

What is claimed is:

1. In a shaft bearing, a pair of bearing shell members cooperating to enclose a portion of the shaft, the ends of said shell members forming axially spaced radial bearings for the shaft and the intermediate portions of said shell members forming a thrust cavity the ends of which are sealed around the shaft by said radial bearings, thrust bearing elements disposed in said cavity and interposed between said shell members and said shaft, an oil reservoir external to said cavity, oil pumping means disposed in said cavity and having a suction connection to said reservoir, and means for returning oil from said cavity to said reservoir, the ends of said radial bearings having oil retaining means preventing the escape of oil axially along the shaft and oil escape passages extending from said retaining means upwardly through said upper bearing shell member.

2. In a shaft bearing, a pair of bearing shell members cooperating to enclose a portion of the shaft, the ends of said shell members forming axially spaced radial bearings for the shaft and the intermediate portions of said shell members forming a thrust cavity the ends of which are sealed around the shaft by said radial bearings, thrust bearing elements disposed in said cavity and interposed between said shell members and said shaft, an oil reservoir external to said cavity, oil pumping means disposed in said cavity and having a suction connection to said reservoir, and means for returning oil from said cavity to said reservoir, the ends of said radial bearings having oil retaining means preventing the escape of oil axially along the shaft and oil escape passages extending from said retaining means upwardly through said upper bearing shell member, the latter having external grooves in which said escape passages terminate and the oil draining from said grooves into said reservoir.

3. In a bearing, a bearing shell enclosing a portion of the shaft and comprising upper and lower shell members, the ends of said shell members cooperating to form radial bearings for the shaft and the intermediate portions of said shell members being enlarged in diameter and forming a cylindrical thrust cavity closed at its ends by said radial bearings, a thrust collar on said shaft and rotating concentrically within said cavity, thrust bearing means disposed in said cavity and interposed between said collar and said shell members, said lower shell member having a recess in its cylindrical surface and opening into said cavity, an oil pumping unit resiliently mounted in said recess and urged outwardly therefrom toward the periphery of said thrust collar to cooperate with said collar as a viscosity pump and to deliver oil into the lower portion of said cavity, and an oil reservoir, said lower shell member having an oil suction passage extending from said recess through the shell and communicating with said reservoir, said upper shell member having an oil outlet passage for returning oil from said cavity to said reservoir.

4. In a bearing, a housing, a bearing shell enclosing a portion of the shaft and comprising upper and lower shell members the central portions of which are enlarged and provided with a spherical outer surface cooperating with a corresponding spherical surface in said housing, said enlarged central portions being hollow and providing a cylindrical thrust cavity around the shaft and the ends of said shell members engaging the shaft and providing radial bearings therefor, a thrust collar on said shaft and rotating concentrically within said cavity, thrust bearing elements disposed in said cavity and interposed between said collar and said shell members, said lower bearing shell member having a substantially rectangular recess formed in its cylindrical surface and facing said thrust collar, a viscosity pumping device mounted in said recess and resiliently urged in a radial direction into engagement with the periphery of said collar, and means providing an oil reservoir and a suction passage leading through said lower bearing shell member to the bottom of said recess, said pumping device delivering oil from said reservoir to the lower part of said cavity and maintaining said cavity full of oil for lubrication of said thrust bearing elements and said radial bearings, said upper shell member having an oil outlet passage from said cavity for returning oil therefrom to said reservoir.

5. A bearing as defined in claim 4, including means for retaining said pumping device in said recess when said lower bearing shell is inverted comprising a retaining member extending through the side walls of the thrust cavity and loosely engaging said device to provide for the aforesaid radial movement of said device into engagement with said thrust collar.

6. A combined radial and thrust bearing particularly adapted for high speed operation and comprising a bearing shell enclosing a portion of the shaft, said shell being formed of upper and lower shell members having enlarged central portions cooperating to provide a thrust cavity around the shaft and reduced end portions cooperating to provide radial bearings for the shaft and to close the ends of said cavity, a thrust collar on said shaft rotating in said cavity, thrust bearing elements disposed in said cavity between said collar and said shell members, said lower shell member having an oil suction passage at its bottom and said upper shell member having an oil outlet passage leading out of said thrust cavity at its top, and means for maintaining said cavity full of oil under pressure and excluding air therefrom comprising oil pumping means connected to said suction passage and discharging oil under pressure into the lower part of said cavity.

7. A bearing as defined in claim 6, comprising oil circulating means connecting said outlet passage with said suction passage externally of the bearing, and oil cooling means interposed in said oil circulating means.

References Cited in the file of this patent

UNITED STATES PATENTS

| Number | Name | Date |
|---|---|---|
| 1,400,168 | Kingsbury | Dec. 13, 1921 |
| 1,609,496 | Reed | Dec. 7, 1926 |
| 2,168,343 | Howarth | Aug. 8, 1939 |

FOREIGN PATENTS

| Number | Country | Date |
|---|---|---|
| 309,837 | Germany | Apr. 4, 1916 |